Feb. 7, 1961   H. DETRICK   2,970,566
MINK CAGE FEEDER PLATE
Filed Nov. 20, 1958
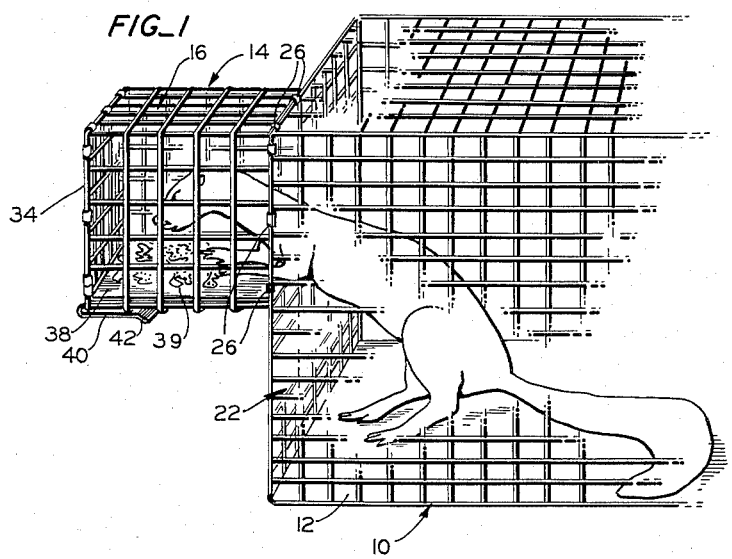
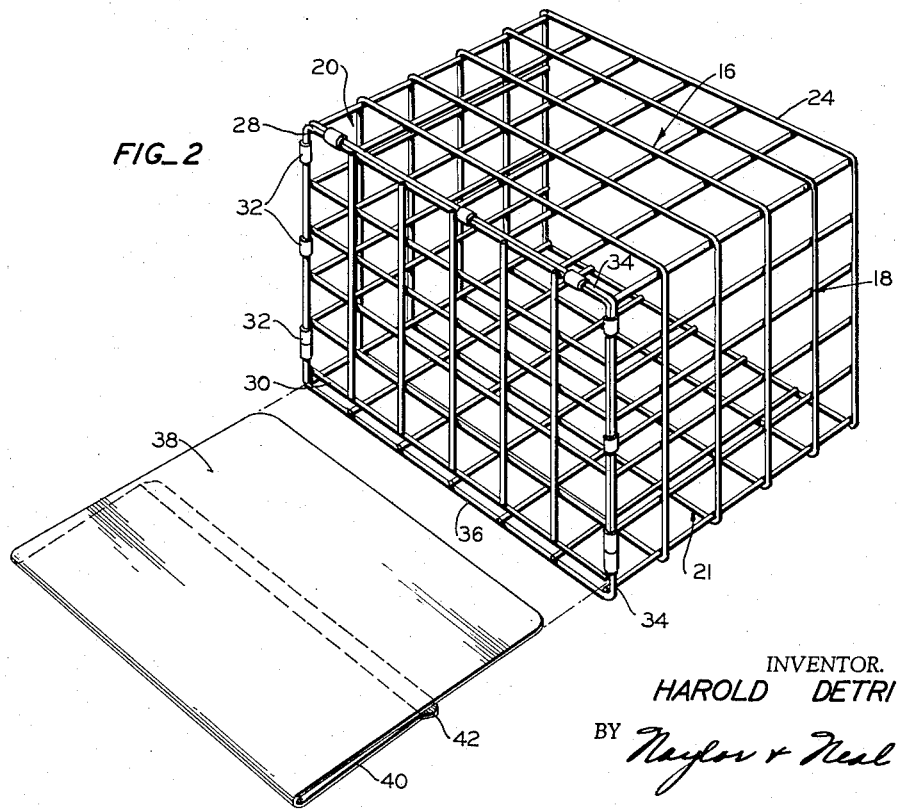
INVENTOR.
HAROLD DETRICK
BY Naylor & Neal
ATTORNEYS

United States Patent Office 2,970,566
Patented Feb. 7, 1961

2,970,566

MINK CAGE FEEDER PLATE

Harold Detrick, Box 258, Montara, Calif.

Filed Nov. 20, 1958, Ser. No. 775,285

4 Claims. (Cl. 119—18)

This invention relates to cages for animals, and more particularly to removable feeder plate means for cages in which minks and other fur-bearing animals may be raised.

"Mink farming on a commercial scale is of such recent growth that new and better methods of feeding, breeding, and management are being continually developed through research and in practice on fur farms." Circular 801, p. 2, United States Department of Agriculture.)

Mink farming has become highly competitive, with the result that successful ventures in such farming call for efficiency, conservation of feed, and the like. One of the foremost duties of a mink farmer, from the standpoint of the time required and of its importance, is the feeding of the animals, which are maintained to a large extent in cages comprising wire-mesh or wire-grid side, top and bottom walls.

The feed, usually a slurry-like mixture comprising meat, cereals, and water or skim milk (cf. p. 19 of the aforementioned Circular 801), is commonly poured into the cage onto a small wooden platform (cf. Figure 3, p. 8, Circular 801). Some of this feed runs off of the platform onto the ground or floor where it serves to attract vermin and insects. Also, the feed residue dries on the platform, and since the platform is not removable from the cage it is difficult to maintain the platform surface in a clean condition. In connection with this difficulty it is to be pointed out that minks can squeeze through very small openings to escape from their cages if these openings are afforded, even briefly, and that minks generally tend to be vicious and bite the hand that feeds or tends them if they are given the opportunity to do so.

With the foregoing in mind, the essential object of this invention is to provide a feeder plate for a mink cage which can be simply and readily removed for cleaning and then replaced without affording an opportunity for the mink or minks within the cage to escape therefrom or to bite the hand of the rancher.

A further object of the invention is to provide a mink cage feeder plate which enhances the efficiency of the farming operation, conserves feed, and which renders it too much easier to keep the cages and cage area in a clean condition.

Other objects and advantages of the invention will be apparent from the following description taken in conjunction with the drawing forming part of this specification, and in which:

Figure 1 is a view in perspective of a mink cage which includes the preferred embodiment of the invention; and Figure 2 is an enlarged view in perspective of the feeder cage attachment for the main cage, the feeder plate therefor being shown as being removed therefrom.

With reference to the drawing, the mink cage 10 comprises a main housing portion 12 and a feed chamber portion 14. The ends, sides, and top and bottom of the housing portion 12 are formed of wire gridworks consisting of mutually perpendicular groups of parallel wires which are secured together, as by soldering, at their cross-over points. The top 16, sides 18 and 20, and bottom 21 of feed chamber portion 14 are similarly formed. The front end 22 of housing portion 12 is provided with a relatively large rectangular opening in the wire lattice work which is the same in size as the full open rearward end of chamber portion 14, and therefore when the rearwardly disposed peripheral wire 24 of chamber portion 14 is secured, as by split sleeve clamps 26, to the wire elements defining said rectangular opening in the end 22 of housing portion 12, the two housing portions are integrated to form a full enclosure for the mink or minks.

The forward end of the feed chamber, as shown, is formed of a separate planar wire grid comprising peripheral wires 28 and 30, the former extending along the top and both sides, and the latter extending along the bottom. Wire 28, to which wire 30 is secured, is in turn secured, as by split sleeve clamps 32, to the peripheral wire 34 constituting the terminal wire of the otherwise open-ended feed chamber housing.

The wire 30 and the lower horizontal part 36 of wire 34 are disposed in vertically spaced relation and define therebetween a narrow slot adapted to accommodate the removable feeder plate 38. When said plate is fully inserted through said slot, it overlies completely the bottom gridwork wall 21 of the feed chamber, thereby serving as a readily and accurately accessible surface for the support of the mink ration, or feed material, 39, the latter being dropped through the upper gridwork wall 16 of the feed chamber.

The feeder plate 38, which is preferably formed of metal, is provided with means for securing it in place against accidental movement, which might be tended to be caused by the mink, or be otherwise caused. Said means comprises a reversely directed tab 40 which is integral with and underlies the plate. The tab 40 is biased, by the spring-like qualities of the metal, toward the plate 38, thereby serving as a clamp which pressingly engages the lower part 36 of wire 34 and, preferably, at least the wire parallel and adjacent thereto.

The tab 40 is provided with a downwardly directed terminal portion 42 which serves the two-fold purpose of (1) causing the tab to be cammed away from the plate by the wire portion 36 to permit the plate to be fully inserted into the feed chamber, and (2) as an element which may be gripped by the fingers of the rancher to both insert the feeder plate within the feed chamber and remove it therefrom, said gripping element, or means, being so located, i.e. at the underside of the plate 38, that the plate shields the rancher's hand from mink bites and clawings.

When the time comes for the rancher to clean the plate of the feed residue, the plate is simply pulled free and brush-scrubbed in a pail of water, or otherwise cleaned without the necessity of the rancher rushing to guard against the escape of the mink through the too-narrow feed chamber plate slot. If the feed residue happens to be dried upon the plate, the plate may be scraped back and forth against the wire 30 to scavenge the residue therefrom, or, for that matter, the plate may be scraped against any accessible wire or wires of the cage once it has been fully removed from the slot.

Having illustrated and described a preferred embodiment of the feeder plate of my invention, what I claim as new and desire to secure by Letters Patent is:

1. A feeder plate of the type described comprising a unitary member having an upper flat plate element and a lower reversely directed tab element disposed beneath said plate in slightly spaced relation therewith, said tab terminating in a tip which is disposed out of the plane of said tab and which is directed away from both said plate and said tab elements, said tab, except for said tip, being uni-planar and being pre-stressed so as to normally incline said tab out of parallel with and toward said upper plate element said unitary member being formed of yieldingly flexible material, whereby said plate and tab elements may be disposed on opposite sides of a lower planar wall portion of a cage in parallel relation with each other and have a clamping action with respect to a substantial area of said wall portion.

2. The feeder plate of claim 1 in combination with a cage having a horizontally disposed planar wall portion and a vertically disposed wall portion joined thereto, said wall portions being each adapted to prevent passage therethrough of an animal within the cage, and means defining a narrow slot-like opening in said vertically disposed wall portion immediately adjacent said horizontally disposed wall portion for the insertion and removal into and out of said opening of the plate element of said unitary member, said plate and tab elements being in clamping relation with said horizontally disposed wall portion when said plate element has been inserted through said opening.

3. The combination of claim 2, said cage having perforate walls enabling feed material to be dropped through said cage onto said plate element when the latter is in overlying relation to said horizontally disposed wall portion, said plate element being imperforate and said tab tip constituting means to be gripped to insert and remove said feeder plate, whereby the cage attendant is protected from the mink or other animal in said cage during manipulation of said feeder plate.

4. The combination of claim 3, said tab tip being directed downwardly at a less than ninety degree angle and being thereby adapted to serve as camming means, in relation to the leading edge of said horizontally disposed wall portion, to yieldingly spread apart said plate and tab elements to admit therebetween said horizontally disposed wall portion.

References Cited in the file of this patent
UNITED STATES PATENTS

| | | |
|---|---|---|
| 2,150,497 | Fernberg | Mar. 14, 1939 |
| 2,166,344 | Donohue | July 18, 1939 |
| 2,601,197 | Wilson | June 17, 1952 |
| 2,696,802 | Schmidt | Dec. 14, 1954 |